US005654902A

United States Patent [19]

Scheidt et al.

[11] Patent Number: 5,654,902

[45] Date of Patent: Aug. 5, 1997

[54] RECYCLABLE COMPONENT WITH DATA STORAGE FOR STORING INFORMATION FOR EXAMINING THE COMPONENT AND PRODUCT INCLUDING SUCH A COMPONENT

[75] Inventors: Lutz-Günther Scheidt, Schwäbisch Gmünd/Lindach; Roger Lagadec, Köln; Shuqiang Zong, Waiblingen, all of Germany

[73] Assignee: Sony Deutschland GmbH, Germany

[21] Appl. No.: 233,762

[22] Filed: Apr. 26, 1994

[30] Foreign Application Priority Data

May 3, 1993 [EP] European Pat. Off. ............ 93 107 166

[51] Int. Cl.[6] ............................ G06F 17/00; G01B 21/00

[52] U.S. Cl. ................................ 364/551.01; 364/468.22; 364/468.23; 364/478.03; 364/478.1

[58] Field of Search .............................. 364/550, 551.01, 364/508, 506, 566, 556, 468.01, 468.12, 468.15, 468.16, 468.17, 478.02, 478.03, 478.07, 478.09, 478.1, 571.01, 571.03, 571.04; 355/203, 202, 204; 264/36, 37; 164/92.1; 396/6; 399/27, 106, 253; 428/903.3

[56] References Cited

U.S. PATENT DOCUMENTS

| | | | |
|---|---|---|---|
| 4,586,147 | 4/1986 | Tadokoro | 364/550 |
| 4,734,348 | 3/1988 | Suzuki | 430/96 |
| 4,745,564 | 5/1988 | Tennes et al. | 364/566 |
| 5,132,729 | 7/1992 | Matsushita et al. | 355/203 |

FOREIGN PATENT DOCUMENTS

| | | |
|---|---|---|
| 1272808 | 8/1990 | Canada . |
| 0092123 | 10/1983 | European Pat. Off. . |
| 2020432 | 11/1979 | United Kingdom . |
| 2110421 | 6/1983 | United Kingdom . |
| 2142172 | 1/1985 | United Kingdom . |
| 2116748 | 9/1993 | United Kingdom . |

OTHER PUBLICATIONS

Patent Abstracts of Japan, vol. 11, No. 291, JP–A–62 085 841, Sep. 1987.

Patent Abstracts of Japan, vol. 14, No. 521, JP 2–218920, Nov. 1990.

*Primary Examiner*—James P. Trammell
*Assistant Examiner*—Edward Pipala
*Attorney, Agent, or Firm*—Ronald P. Kananen

[57] ABSTRACT

The invention relates to the problem of recycling of products of complicated structure and is based on the idea to provide each component of the product with a memory in which not only at the timing of production information such as location of material to be recycled is stored but also additional data, e.g., about repair and/or specific stress to which the component has been exposed during its use. Such additional data may be collected via specific sensors provided either on each component or in or on the body of the product to be memorized in the memory of each component. Based on the idea of the invention, the life history of each component of the discarded product can be checked individually for determining whether such component may be reused or disposed for disassembling and recycling.

17 Claims, 2 Drawing Sheets

Figure 1:
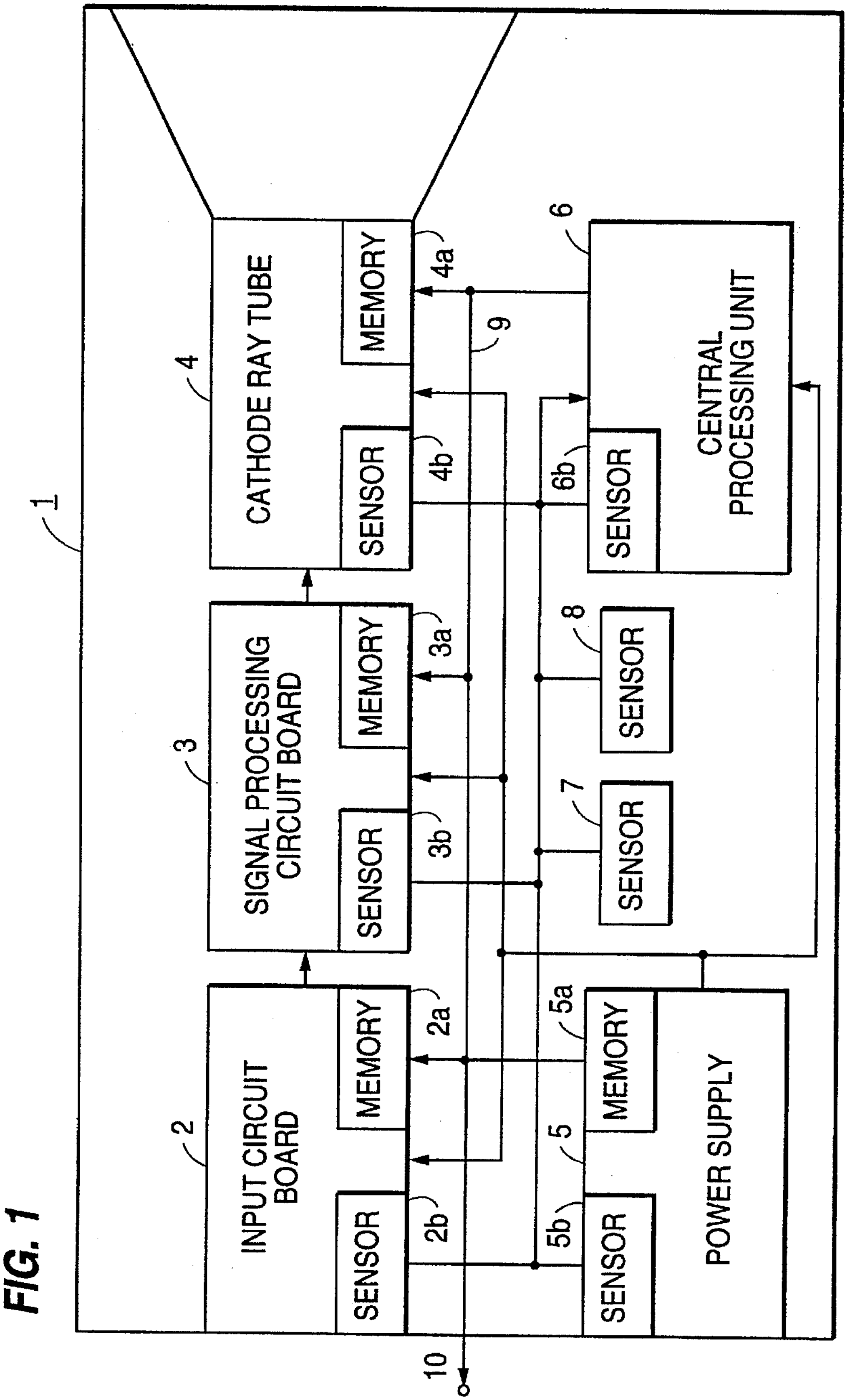

RECYCLABLE COMPONENT WITH DATA STORAGE FOR STORING INFORMATION FOR EXAMINING THE COMPONENT AND PRODUCT INCLUDING SUCH A COMPONENT

The invention relates to a recyclable component, a product including such a recyclable component and to a check device for examining such a recyclable component.

There are many different kinds of products made by different manufacturers coming into the market and each such product also contains many different kinds of components. If a product becomes obsolete or is taken out of service, the user wants to abandon the product and usually disposes it in one or another undesirable way. Even if the product itself becomes old or invalid, components contained in the product or a part of each component, however may be reused in another product. Therefore, recently recycling of those components is eagerly discussed under an environmental point of view.

One way to enable recycling of a component easier is to indicate on the surface thereof the kind of material which constitutes the component. For example, if a component such as a hausing of a television receiver or a chassis of automobile is formed of a single plastic or metal material, the component can bear the name of the material or a symbol representing the same. It is, however, very difficult to indicate enough information to recycle the component, if the latter is comprised of many kinds of materials or has a complicated constructional composition.

As a type of recycling of a component, it has also been considered to reuse the component as it is, without breaking it up, i.e., in an appliance of same type or in a similar type of the product in which the component was used before, or as a service spare part. In that case, the indication of the kind of material is insufficient and it is more important to know how long the component has already been used or whether the component can still be reused for long enough a period in the future. Such information is very important, especially for electrical components or mechanical components having a movable part. Such transitional information can not be indicated properly on the surface of a component.

Meanwhile, it is known, for example by Canadian Patent 1,272,808, to include a memory in the product for storing information data as to production and repair or maintenance service of the product. Such information, however, is useless for recycling, because some components taken from the product are transferred to a recycling process instead of the product itself. Furthermore, if the product has not been repaired in spite of that the component has been impaired or damaged, such information is incomplete and not reliable.

According to U.S. Pat. No. 4,586,147, a product may be further provided with a sensor detecting failure information of the product during its use. The failure information and the history information as to the failures which is stored in a memory provided in the product can be used for maintenance. However, because such failure information and history information will remain only in the main body of the product when the consumed product is forwarded to recycling, it is impossible to know any defect caused in each or at least in the essential components of the product.

It is also known, for example, from UK Patent Publication GB 2116748 A, that each circuit board comprising a plurality of components may include a memory for storing information as to assembly or testing which is necessary during production. In the course of testing, if any faulty component mounted on the circuit board is found, the identity of the faulty component is written into the memory and any necessary remedial action will be taken as part of the production. Therefore, only circuit boards including no faulty components can be used for completing the product. However, there is no way to identify any defect of the circuit board occurring during the use of the product, which, however, is a most important information for recycling.

UK Patent Publication GB 2142172 A also discloses that each assembly or subassembly constituting a product has a memory for storing elapsed time and maintenance information such as the time of the last overhaul. However, such information is not sufficient for recycling the assembly or sub-assembly.

After all, in the above described prior art, it is very difficult to examine discarded products properly before forwarding to recycling of each component and easily evaluate each component which has been taken from the discarded products and which may have defects caused during its use.

According to the invention, this problem is solved by providing each component constituting a product with a memory for storing information data useful for recycling.

Figure 2:
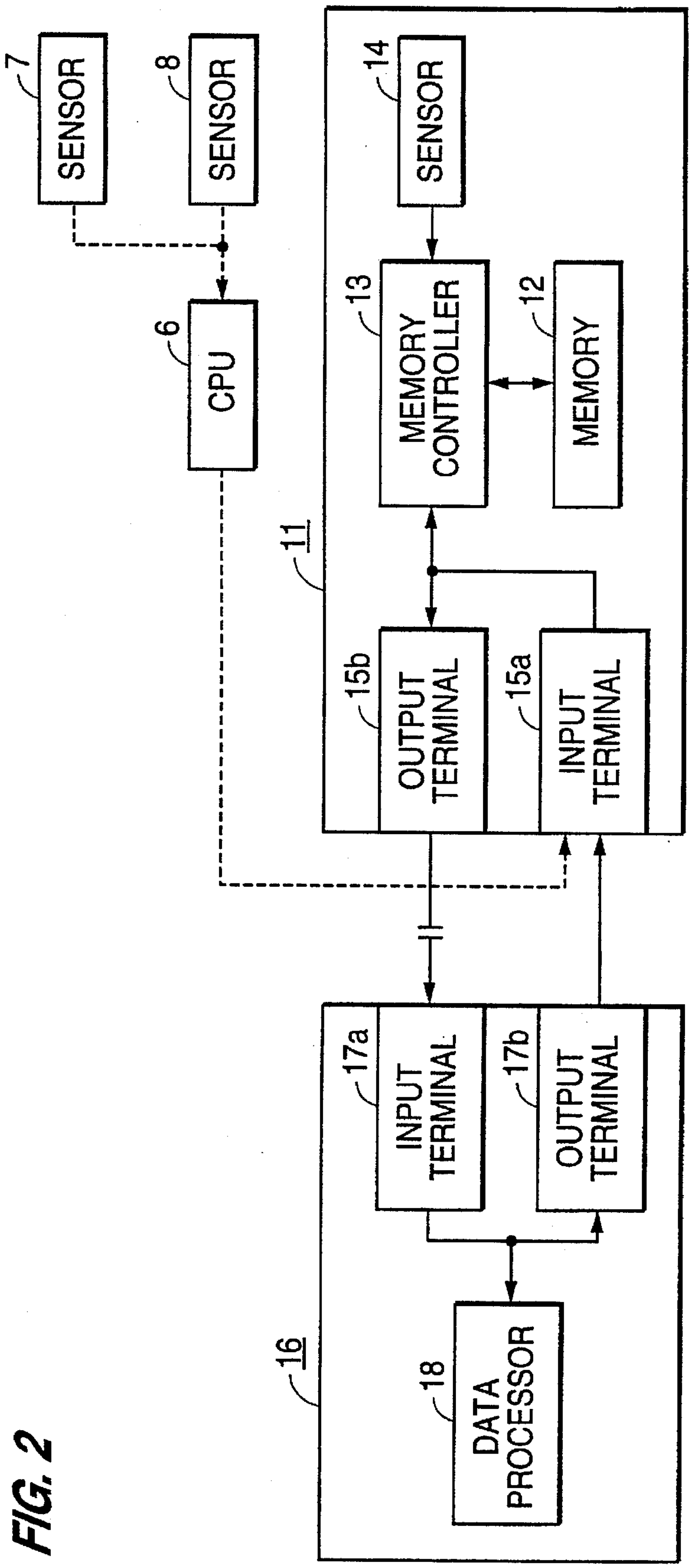

One way of carrying out the invention is described in detail below with reference to drawings which illustrate a specific embodiment, in which:

FIG. 1 is a schematic block diagram showing a television receiver as an embodiment according to the invention; and FIG. 2 is a schematic block diagram showing an example of component according to the invention including a check system for checking the condition of the component.

Referring to FIG. 1, a television receiver 1 has normally an input circuit board 2 including an antenna input terminal, a tuner and auxiliary input terminals, a signal processing circuit board 3, a cathode ray tube 4, a power supply 5 and a central processing unit (hereinafter CPU) 6 as its main components. It will be omitted to explain the well known function and operation of each component and the television receiver 1, which are irrelevant to the invention.

The voltage source is supplied from the power supply 5 to respective components 2, 3, 4 and 6. Control signals from the CPU 6 are supplied to respective components 2, 3, 4 and 5 so as to control the same during operation of the television receiver 1.

According to the invention, each component 2, 3, 4, or 5, which or a part of is aimed to be recycled, has a memory unit *2a*, *3a*, *4a* or *5a* (an internal memory installed in the CPU 6 may be used as a memory unit for the CPU 6) which store information data necessary for the evaluation of the component before forwarding to recycling. Such information data can be classified into two types; active data and passive data.

Active data may include, for example, information as to stress to which the component has been exposed during use, i.e., a) maximum/minimum temperature; b) maximum acceleration (in case the component has been dropped or shocked); c) minimum power consumption; d) maximum voltage; e) maximum humidity exposure; f) function caused by the component; g) short circuit occurred in relation to the component; h) operation hours of the component; i) outgassing; j) emissions; k) electromagnetic radiation: each exceeding a given tolerance and long and how often, but not limited to those.

Such information classified into active data is detected by one or more physical (mechanical) or chemical sensor *2b*, *3b*, *4b*, *5b*, *6b*, 7 or 8 provided within the television receiver 1 or directly in or on each component 2, 3, 4, 5 or 6 and stored selectively into each memory *2a*, *3a*, *4a* or *5a*. Each component 2, 3, 4 or 5 may require different information to be evaluated according to the nature of the component, therefore, different sensors may be used. Some sensor, however can be commonly used for different kinds of components.

The television receiver 1 may have a separate memory unit (though not illustrated) for storing information data commonly related to several components or information data related to the television receiver 1 as a whole, such as construction of the television receiver 1, the locations of the components or instruction of disassembly. Such information may be very useful for automatic or even manual disassembly. Such separate memory unit may be replaced with the memory of the CPU 6. All or some of the memory unit might be also connected through a data bus 9 to a diagnostic connector 10 provided to the external of the television receiver 1, which enables data retrieving without opening the housing.

If the television receiver 1 is (connected to the main power source regardless whether the television receiver 1 is actively used or operated in the stand-by mode, the central processing unit 6 is always operative so that the detected signal from each sensor 2*b*, 3*b*, 4*b*, 5*b*, 6*b*, 7 or 8 can be processed, and the above described stress data is stored or renewed in each memory unit 2*a*, 3*a*, 4*a* or 5*a*, or in the internal memory of the CPU 6. In case that each sensor is a self-hold type which can maintain the condition detected last, even if the television receiver 1 has been disconnected from the main power source, the CPU 6 can store and release the last detected condition from each sensor 2*b*, 3*b*, 4*b*, 5*b*, 6*b*, 7 or 8 as long as the television receiver 1 is connected to the main power source. If the television receiver 1 is a battery operated type or installed with a back-up battery, there is also no problem.

In addition to the above active data, each memory unit 2*a*, 3*a*, 4*a* or 5*a* of each component 2, 3, 4., 5 or 6 must or may further stores passive or supplementary information data. Passive data may include, for instance, manufacturing data of the component which has been set in the factory. Supplementary (active or passive) data may include, for instance, distribution and sales data of the component which has been set during distribution and assembly of the finished product; history of repair and maintenance service data which has been set during repair and maintenance service; data of technical conditions for product guarantee in order to protect against unjustified guarantee claims. These memory units might be used for secondary purposes. If a power management unit is built into the product in order to reduce energy consumption during normal usage of the product, relevant data can be stored in a memory unit.

The manufacturing data of the component may includes manufacturer information such as trademark or name of producer, model name or number, individual product number or serial number, manufacturing date and place, specifications, composing materials—the sorts of applied plastics and additives, locations of built-in hazardous materials, official life of the component, manufacturing history, testing information, fault reporting information. The information regarding manufacturer might be used to classify products or components collected for recycling according to the manufacturer. This is useful, for example, in deciding the interchangeability of certain components in the field of services. The information regarding specifications or locations of the applied materials will help recycles in the removal of hazardous materials or, the recovery of precious metals and sorting of plastic fractions.

The distribution and sales data of the component may includes wholesaler and retailer's name, purchase date, sales date, purchase price, selling price, destination. If the ownership of the component is changed on recycling, such information on the ownership can be stored or modified by recycles. The history of repair and maintenance service data may includes replacement information of the component, parts repair and adjustments of only part of the component.

The above described active, passive and supplementary information data can be stored in a certain format, preferably in a common format regardless of type of components. More preferably, the information data are categorized according to the nature of the information as described above and stored selectively in designated memory areas or stored as block data together with data identifying the categories. As all or sane of passive data is not required to be modified, even service personnel, vendors and recycles have no possibility to input or rewrite all or some of passive data into the memory units. Active data is relatively important to evaluate the component to be recycled and to assess the commercial value thereof. To prevent data manipulation, the stored data are selectively tamper-proof by means of appropriate memory media and recording mechanisms for example encryption as occasion demands. Therefore, only authorized personnel can modify some active data, passive data and supplementary data with special devices, if necessary. For example, the official life time set by the first manufacturer of the component may be replaced with an official life time estimated by the supplier of the recycled component on the basis of the residual life time and the quality check result. Therefore, an appropriate type of memory such as PROM, EPROM or EEPROM may be selected for each memory unit according to the function thereof to be required and the category of information data to be stored thereinto.

Referring to FIG. 2, more detail construction of each component is explained. The component 11 has, besides its own functional elements, the memory unit including a memory 12, a memory controller (or interface) 13 and a sensor 14 as an option. The memory 12 is preferably a non-volatile memory as the component will be examined even after being taken out from the product. The memory unit might be a dual-port type, one port for recording active data, one port for retrieving active and passive data. In that case, the memory unit has an input terminal 15*a* and an output terminal 15*b*. These terminal may be combined in a single input/output terminal.

The stress information detected by the sensor 7 or 8 provided within the television receiver 1 as shown in FIG. 1 or by the sensor 14 provided to the component 11 is supplied to the CPU 6 provided within the television receiver 1 as shown in FIG. 1, if the detected stress information is required to be processed so as to form a proper data signal. The processed data signal derived from the CPU 6 is written into the memory 12 through the input terminal 15*a* and the memory controller 13.

The stress information detected by the sensor 7, 8 or 14 is supplied through the terminal 15*a* or other terminal or the memory controller 13 to the memory if the detected stress information is not required to be processed. Other active data, passive data and supplementary data can be also stored in a similar manner to the above.

As a sophisticated embodiment, the component 11 or the memory unit may include a micro-processor with a memory instead of the memory controller 13, which can replace the CPU 6 in connection with the invention. Even each component 11 may have an own battery.

When the television receiver 1 becomes outdated or should be taken out of service and is forwarded to recycling, the information data stored in the memory units can be used to manage the distribution, disassembly and disposal process. From each of discarded and then collected television receivers, the information stored in the memory units are read out through the diagnostic connector 10 to check quality of each component with a check device 16 and assist in deciding which components still have a relatively high residual value. Television receivers containing component of higher residual value are then sent to automatic or manual disassembly line for recovery of valued components, possibly according to the information of the location of the valued component and instruction data of disassembly.

The disassembled components are sorted into same kind or type according to the passive information. Such sorted components are subjected to dedicated quality checks in more detail and classified according to the stress information into a specified tolerance field allowing a defined future use. Components qualified or certified for reuse are subsequently refurbished if requested and forwarded to manufacturers using the qualified or certified components. Similarly, the components with a high content of pure plastics or precious materials are sent to dedicated recovery lines. Particularly, hazardous materials can be removed safely and with certainty, since detailed information about the materials and their locations in the components is also available in the memory units.

The check device 16 has an input terminal 17*a*, a data processor 18 and, if necessary, an output terminal 17*b* which may be combined with the input terminal 17*a*. The component 11 is connected to the check device 16 through the output terminal 15*b* of the former and the input terminal 17*a* of the latter, through the diagnostic connector 10 before disassembly or directly after disassembly. The data processor 18 of the check device 16 reads out the information data stored in the memory 12 through memory controller 13 and the output terminal 15*a*. The data processor 18 of the check device 16 may output information data to be stored in the memory 12 through the input terminal 15*a* and the memory controller 13.

The connection of the component 11 and the check device 16 can be achieved by means of wireless data transmission to allow easy automation of the check procedure. In that case, the component 11 and the check device 16 are provided with wireless transmitters and receivers, respectively, instead of the output terminals 15*b* and 17*b* and the input terminals 15*a* and 17*a*, respectively.

Although memory units are solely used for storing information data, bar code or printed markings can be used also for storing relatively simple static information data in combination with the memory units.

The application of the invention is not limited to electric or electronics components but also applicable to mechanical components or any other components, if such a component can be provided with a memory. Component blocks, modules, assembles or sub-assembles also can be called generally as components in the sense of this invention.

The products which Utilize components according to the invention are also not limited to television receivers but can be also any electric, electronics or mechanical products.

We claim:

1. A recyclable product comprising:

a) one or more component blocks;

b) sensor means associated with said one or more component blocks, said sensor means detecting a condition of one or more of the associated component blocks and providing a detection signal representative thereof;

c) memory means included with at least one of said one or more component blocks; and d) control means for receiving said detection signal from said sensor means, processing the detection signal, and providing said memory means with the processed detection signal;

wherein said sensor means detects stress of said component block during use and derives the detection signal so as to include stress information that is indicative thereof;

wherein said memory means stores said stress information and also stores passive data necessary for recycling said one or more component blocks; and wherein at least one of said one or more component blocks includes output terminal means for release of information data including the stress information and the passive data stored in said memory means, said stress information including active data indicative of at least one of the following conditions detected by the sensor means: (a) maximum/minimum temperature; (b) maximum acceleration; (c) maximum power consumption; (d) maximum voltage; (e) maximum humidity exposure; (f) malfunction caused by the component; (g) short circuit occurred in relation to the component; (h) outgassing; (i) emissions; and (j) electromagnetic radiation;

whereby each said one or more component blocks are recyclable on the basis of the passive data and the active data provided from the output terminal means.

2. A recyclable product according to claim 1, wherein said product includes a plurality of said component blocks each including at least one sensor.

3. A recyclable product according to either one of claim 1 or 2, wherein at least one of said one or more component blocks further includes input terminal means for receiving the processed detection signal from said control means.

4. A recyclable product according to claim 1, wherein the passive data includes the location within the product of said one or more components.

5. A recyclable product according to claim 1, wherein the passive data includes the location of hazardous or precious material.

6. A recyclable product according to claim 1, wherein the memory means are tamper-proof.

7. A method of recycling a product that includes at least one component, said method comprising the steps of:

a) reading out from memory means provided within the product and associated with said at least one component information data related to said at least one component, said information data including active data describing stress that said at least one component has undergone and passive data indicating at least one of: the location of the component, and instructions for disassembly of the product;

b) disassembling the product to separate the at least one component according to the passive data;

c) sorting the at least one component according to the active data; and d) forwarding the at least one component for subsequent use thereof.

8. A method according to claim 7, wherein said active data is descriptive of at least one of the following conditions experienced by the component: maximum/minimum temperature; maximum acceleration; maximum power consumption; maximum voltage; maximum humidity exposure; malfunction; short circuit; outgassing; emissions; and electromagnetic radiation.

9. A method according to claim 7, wherein said passive data includes manufacturing data that includes at least one of the following: name of the manufacture; model name or number of the component; individual product number or serial number of the component; manufacturing date and location; component specification; location of the component within the product; composition of the component; predicted life of the component; manufacturing history of the component; testing information; and fault reporting information.

10. A method according to claim 7, wherein said information data further includes supplementary data comprising at least one of: distribution and sales data; history of repair and maintenance service data; and data of technical conditions for product guarantee claims.

11. A recyclable product comprising:

a plurality of components;

sensor means associated with each of the plurality of components for sensing conditions undergone by an associated component and producing detection signals based thereon;

control means coupled to the sensor means for processing the detection signals and outputting processed detection signals as active data;

memory means coupled to the control means and associated with each of the plurality of components, the memory means storing the active data output from the control means and also storing passive data concerning associated ones of the plurality of components that is necessary for recycling the components; and terminal means associated with each of the plurality of components, the terminal means providing remote access to the memory means associated with each of the plurality of components;

whereby the active data and passive data stored in the memory means are accessible to determine which of the plurality of components are amenable to recycling.

12. A recyclable product according to claim 11, wherein the active data is descriptive of at least one of the following conditions experienced by the component: maximum/minimum temperature; maximum acceleration; maximum power consumption; maximum voltage; maximum humidity exposure; malfunction; short circuit; outgassing; emissions; and electromagnetic radiation.

13. A recyclable product according to claim 11, wherein the passive data includes manufacturing data that includes at least one of the following: name of the manufacture; model name or number of the component; individual product number or serial number of the component; manufacturing date and location; component specification; location of the component within the product; composition of the component; predicted life of the component; manufacturing history of the component; testing information; and fault reporting information.

14. A recyclable product according to claim 13, wherein the passive data includes the presence of hazardous or precious material within a particular component.

15. A recyclable product according to claim 11, wherein the memory means further stores supplementary data comprising at least one of: distribution and sales data; history of repair and maintenance service data; and data of technical conditions for product guarantee claims.

16. A recyclable product according to claim 11, wherein the memory means are tamper-proof.

17. A system for recycling products comprising:

a plurality of products, each including:

a plurality of components;

sensor means associated with each of the plurality of components for sensing conditions undergone by an associated component and producing detection signals based thereon;

control means coupled to the sensor means for processing the detection signals and outputting processed detection signals as active data;

memory means coupled to the control means and associated with each of the plurality of components, the memory means storing the active data output from the control means and also storing passive data concerning associated ones of the plurality of components; and output terminal means associated with each of the plurality of components; and a check device for examining the components of the plurality of products, the check device including:

output terminal means for connection to the input terminal means of the components; and data processing means for analyzing the passive data and active data stored in the memory means so as to determine whether a given component is recyclable.

* * * * *